United States Patent
Cruz-Hernandez et al.

(10) Patent No.: US 10,082,872 B2
(45) Date of Patent: Sep. 25, 2018

(54) DEFORMABLE HAPTIC WEARABLES WITH VARIABLE PHYSICAL PROPERTIES

(71) Applicant: Immersion Corporation, San Jose, CA (US)

(72) Inventors: Juan Manuel Cruz-Hernandez, Montreal (CA); Jamal Saboune, Montreal (CA); Abdelwahab Hamam, Montreal (CA); Vincent Levesque, Montreal (CA)

(73) Assignee: Immersion Corporation, San Jose, CA (US)

( * ) Notice: Subject to any disclaimer, the term of this patent is extended or adjusted under 35 U.S.C. 154(b) by 72 days.

(21) Appl. No.: 14/585,429

(22) Filed: Dec. 30, 2014

(65) Prior Publication Data

US 2016/0187977 A1    Jun. 30, 2016

(51) Int. Cl.
*G06F 3/01*  (2006.01)
*G06F 1/16*  (2006.01)

(52) U.S. Cl.
CPC ............. *G06F 3/016* (2013.01); *G06F 1/163* (2013.01)

(58) Field of Classification Search
CPC .......... G06F 1/163; G06F 3/016; G06F 3/017; G06F 3/03547; G06F 3/04883; G06F 1/1643; G06F 1/1694; G06F 1/1698; G06F 2200/1637
See application file for complete search history.

(56) References Cited

U.S. PATENT DOCUMENTS

| | | | | |
|---|---|---|---|---|
| 6,180,178 B1* | 1/2001 | Vogt | ..................... | A41C 3/0014 128/101.1 |
| 9,052,695 B1* | 6/2015 | Fedan | ..................... | A44C 5/147 |
| 2009/0126084 A1* | 5/2009 | Fenske | ................... | A41C 3/005 2/338 |
| 2010/0141407 A1* | 6/2010 | Heubel | ................... | G06F 1/163 340/407.1 |
| 2010/0226075 A1* | 9/2010 | Jahge | ..................... | G06F 1/1664 361/679.01 |
| 2010/0302914 A1* | 12/2010 | Faucher | ................. | A44C 5/147 368/282 |

(Continued)

FOREIGN PATENT DOCUMENTS

WO    2014/117125 A1    7/2014

OTHER PUBLICATIONS

M. McEvoy et al., "Robotic Materials With Controllable Stiffness", The 19th International Conference on Composite Materials (ICCM19), Department of Computer Science and Material Science Engineering Program, Montreal, Canada, Jul. 28-Aug. 2, 2013.

(Continued)

*Primary Examiner* — Kenneth Bukowski
(74) *Attorney, Agent, or Firm* — Miles & Stockbridge P.C.

(57) ABSTRACT

A haptically-enabled device has an interface for receiving an instruction to provide haptic information. The device includes a tangible element with a physical property including length, stiffness, or texture. A haptic output device is attached to the tangible element and a haptic response module provides haptic information to the haptic output device. The haptic output device causes the tangible element to be altered from a first state to a second state of the physical property.

20 Claims, 5 Drawing Sheets

(56) References Cited

U.S. PATENT DOCUMENTS

2014/0026440 A1* 1/2014 Beers .................. A43B 3/0005
36/50.1
2014/0240108 A1* 8/2014 Matthews ................ G08B 6/00
340/407.1

OTHER PUBLICATIONS

Carter S. Haines et al., "Supplementary Materials for Artificial Muscles from Fishing Line and Sewing Thread", Science AAAS, www.sciencemag.org/content/343/6173/868/suppl/DC1, Feb. 21, 2014, Science 343, 868 (2014).

* cited by examiner

DEFORMABLE HAPTIC WEARABLES WITH VARIABLE PHYSICAL PROPERTIES

FIELD

One embodiment is directed to a wearable device. More particularly, one embodiment is directed to a haptically-enabled wearable device.

BACKGROUND INFORMATION

Wearable devices can be a convenience to users. Haptics can be incorporated into wearable devices to provide haptic information such as feedback or notifications to a user. For example, a smartwatch can vibrate when a notification is sent to a user wearing the watch, thereby notifying the user inaudibly.

Conventional devices use visual and auditory cues to provide feedback to a user. In some user interfaces, haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within a simulated or virtual environment.

SUMMARY

One embodiment is a haptically-enabled device with an interface for receiving an instruction to provide haptic information. The device includes a tangible element that has a physical property including length, stiffness, or texture. A haptic output device is attached to the tangible element and a haptic response module provides haptic information to the haptic output device. The haptic output device causes the tangible element to be altered from a first state to a second state of the physical property.

DETAILED DESCRIPTION

Figure 1:
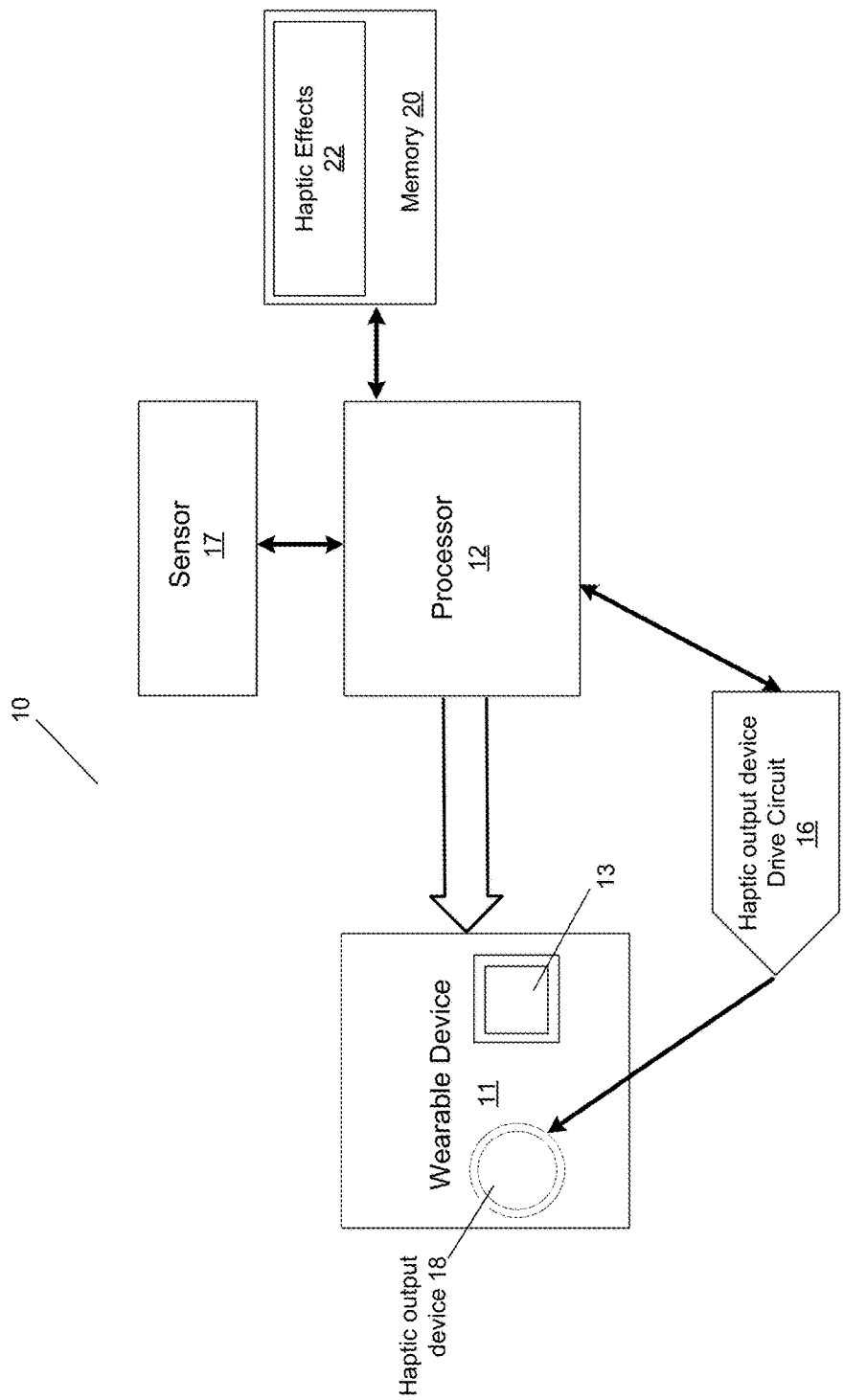
FIG. 1 is a block diagram of a haptically-enabled system in accordance with one embodiment of the present invention.

Deformable wearable devices can be used to provide haptic information or haptic feedback to a user by deforming the device by changing a physical property of a tangible element of the device from one state to another state. Deformation can be a more natural way of conveying information as opposed to vibration. Deformation can be more natural and human like (e.g., tapping someone on the shoulder), whereas vibration can be more efficient at displaying alerts or alarms to gain instant attention. Wearable devices provide a vast array of mediums to provide such haptic information. Different techniques can be used to achieve the change from one state to another to provide a deformation-based haptic effect.

As used herein, a wearable device is any device that can be worn by a user and that is in contact directly or indirectly, permanently or intermittently, with a user's body part. A graspable (by the hand) device is also considered a wearable device even if it is only "wearable" so long as it is grasped, such as an arm rest of a chair or a phone. Also as used herein, a deformable device is a device that can deform or change physical properties like stiffness or size from one physical state to another, and that can be programmable such that the sense of touch can distinguish the different programmed states. Examples of physical properties that can be deformed using the disclosed embodiments include length, size, stiffness/rigidity, texture, shape, elasticity, temperature, friction, and so forth.

The following example embodiments will be discussed in greater detail individually, below.

One embodiment is a deformable wearable device that can change a physical property of a tangible element as part of a deformation-based haptic response. Changing the physical property can provide a user with haptic feedback based on the type of change.

One embodiment is a deformable wearable device that can variably change its length. For example, a tangible element of the device can include nylon fibers coated with electrodes, such as carbon nanotubes. When a current is passed through the electrodes, the nylon fibers will shrink, causing the length of the tangible element to shrink. The tangible element can be incorporated into a strap, fastener, or sleeve on a wearable device. When the length of the tangible element is lessened, the strap, fastener, or sleeve can become tighter.

Another embodiment is a deformable wearable device that can also variably change its length. In this example, a tangible element of the device can be a strap of a wearable device attached to an electric motor. When a current is applied to the motor, the motor can engage and turn to lessen the length of the strap, thereby making the wearable device tighter at the strap.

Another embodiment is a deformable wearable device that can variably change its stiffness. For example, a tangible element of the device can include a composite material such as polycaprolactone in the physical element. One example of the tangible element is a band of a wristband for example on a watch. The polycaprolactone or other suitable composite material can be heated with a proximal heating element, causing the stiffness of the material to increase with increased heat or decrease with decreased heat.

Another embodiment is a deformable wearable device that can variably change its texture. For example, a tangible element of the device can include a matrix of electroactive polymer ("EAP") haptic output device deposits on the surface of the tangible element, such as a band of a wristband. Carbon nanotubes can form a base layer or top layer, then the EAP output devices, then an electrical matrix corresponding to each of the EAP deposits, such that each EAP output device can be activated by supplying an electrical signal to the EAP. The texture of the tangible element can be changed to feel bumpy.

Another embodiment is a deformable wearable device that can also variably change its texture. For example, a tangible element of the device can include a matrix of electrostatic friction ("ESF") output devices similarly placed as the EAP output devices described above, but achieving a different texture feel. The texture of the tangible element can be changed to feel smoother or rougher by changing the static force.

Another embodiment is a deformable wearable device that can also variably change its texture. For example, a tangible element of the device can include a matrix of ultrasonic frequency ("USF") output devices similarly placed as the EAP output devices described above, but achieving a different texture feel. The texture of the tangible element can be changed to feel smoother or rougher by changing the feel of the surface friction.

While the example embodiments above will be described in greater detail below, they each represent a deformable wearable with a tangible element that can be physically altered from one state to another to produce a haptic effect.

FIG. 1 is a block diagram of a haptically-enabled system 10 in accordance with one embodiment of the present invention. System 10 includes a wearable device 11 with a tangible element 13. Internal to system 10 is a haptic feedback system that generates haptics on system 10. In one embodiment, a haptic effect is generated on tangible element 13.

The haptic feedback system includes a processor or controller 12. Coupled to processor 12 are a memory 20 and a haptic output device drive circuit 16, which is coupled to a haptic output device 18 located on wearable device 12. Haptic output device 18 can include any type of haptic output device as described herein, including nylon fibers with carbon nanotubes, motors, actuators, polycaprolactone bars wrapped in a heating element, ESF devices, USF devices, and any other haptic output device that can be used to cause a physical property of a device to change.

In addition to the haptic output devices discussed above, system 10 may include a variety of other haptic output devices including flexible, semi-rigid, or rigid materials, including smart fluids actuators, rheological fluidic actuators, Macro-Fiber Composite ("MFC") actuators, Shape Memory Alloy ("SMA") actuators, piezo actuators, and Micro-Electro-Mechanical System ("MEMS") actuators.

Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. A haptic effect may be considered "dynamic" if it includes some variation in the generation of haptic effects amongst haptic output device(s) or a variation in the generation of haptic effects based on a user's interaction with wearable device 11 or some other aspect of system 10.

Processor 12 outputs the control signals to haptic output device drive circuit 16, which includes electronic components and circuitry used to supply haptic output device 18 with the required electrical current and voltage to cause the desired haptic effects. System 10 may include more than one haptic output device 18, and each haptic output device may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate drive signals for haptic output device 18 that provide haptic effects, as disclosed in more detail below. Memory 20 may also be located internal to processor 12, or any combination of internal and external memory.

System 10 may include a variety of sensors, such as sensor 17, for sensing interactions with wearable device 11 including, among others: strain gauge sensors to measure the deformation magnitude during interactions, force sensing resistor ("FSR") sensors to measure the force/stress applied to the wearable device structures, multi-touch touch sensors to detect the location of single or multiple touches on the wearable device, multi-touch pressure sensors to measure the pressure applied under each touch location, temperature/humidity/atmospheric pressure sensors to capture environmental conditions, an accelerometer/gyroscope/magnetometer to characterize the motion, velocity, acceleration and orientation of the device, a microphone to capture a user's voice command or environmental audio information, and wireless transmitters to receive/transmit information from/to other devices wirelessly. The data corresponding to sensor 17 is sent to processor 12, or another processor within system 10, and processor 12 interprets the sensor data and provides a response that can include haptic effects.

System 10 may be any kind of wearable device that is made deformable at least through the application of haptic output devices as described herein. Such wearable devices can include but are not limited to: clothing items, devices, accessories, modified devices, and purpose-built devices.

Clothing items and accessories can include items such as shirts, pants, dresses, belts, suspenders, hats, gloves, socks, boots, shoes, shoelaces, underwear, swimwear, wetsuit, skin suit, leggings, pajamas, athletic wear, rings, goggles, glasses, bracelets, anklets, necklaces, hairbands, earrings, other jewelry, and so forth.

Devices can include items such as phones, phone cases, watches, music players, biometric sensors, arm rests, computer mice, timers, pens (to change shape, size, or stiffness of tip—pen vs. brush-like effect), pens (to provide deformation based on information from another source—e.g., deformation in a pen used to write prescriptions based on patient information in a file), dentures, braces, orthotics, pedometer, pagers, and so forth.

Accessories can include items such as purses, backpacks, bags, bundling straps, tie downs, and so forth.

Modified devices can include items such as a cane (deformation depending on surface where the cane stands), steering wheels or handle bars (deformation to provide directions or directional information), bracelet (deformation to provide information such as an alert when a child moves out of proximity of parents), keyboards (deformation to reconfigure, highlight key combinations, reshape keys), containers (deformation of handle to provide information on viscosity or texture of liquid in a blender, level of liquid in a container, heat of liquid in a microwaved container; deformation of container size based on what or how much is inside the container; deformation based on weight of contents or expiration date of contents), handles in bags (deformation to massage hand), buttons that can be reconfigured, surfaces that can be deformed to supply grip, objects to resist manipulation through increased stiffness like a wallet that resists opening, shoes that can alter to simulate different terrains, construction equipment such as hats and gloves that can deform to provide information related to safety, procedures, health, or other communication, and so forth.

Purpose built devices can include items such as a device to stimulate Chinese medicine pressure points, support braces that can become more or less rigid, a deformable wearable box for patients to store pills that can deform as a reminder to take medicine, games with gameplay based on deformable properties of an object, devices used in sports or physical therapy to guide exercises or inform user to do or know something, a photographic lens add on to deform to hood ambient light or provide wide-angle or narrow-angle changes, a comfort device to provide emotional communication (such as a hug sent by remote loved-one), a device to communicate information (such as power on/off, recording on/off, wetsuit information, environmentals like temperature, barometric pressure, or the presence of dangerous chemicals or sufficient oxygen), toys (such as modeling dough with haptic output devices integrated that can be formed into any shape), shape changing toys (such as a toy sword that is hard, but becomes soft and flexible when within a certain proximity to the face), cut-able materials with integrated haptic output devices that can be configured and integrated into craft projects and manufacturing processes, and so forth.

Other types of wearable devices that can utilize deformation as described herein can include biofeedback devices to deform a wearable device based on heart rate or insulin levels, such as deformation that beats at the same rate as your heart or another's heart, stiffness of a wearable device that changes based on insulin level, or an armband that squeezes the user when heartbeat reaches unsafe levels. Buttons on phones could be programmable based on landscape or portrait mode of the phone. Surfaces could adapt to the shape of a user's fingers. One game could be configured to interact with a programmable deformation on the outside of a wrist band that interacts with a racing deformation going around the inside of the band. Athletic clothing can be formed with adjustable tightness and can transmit information regarding athletic training or performance to the athlete through the athlete's clothing.

Although the specific embodiments discussed herein may include example applications provided in order to supply example contexts of use, one of skill will understand that the techniques described in relation to each embodiment can be easily adapted for use in other applications such as those listed above, and the like.

Figure 2:
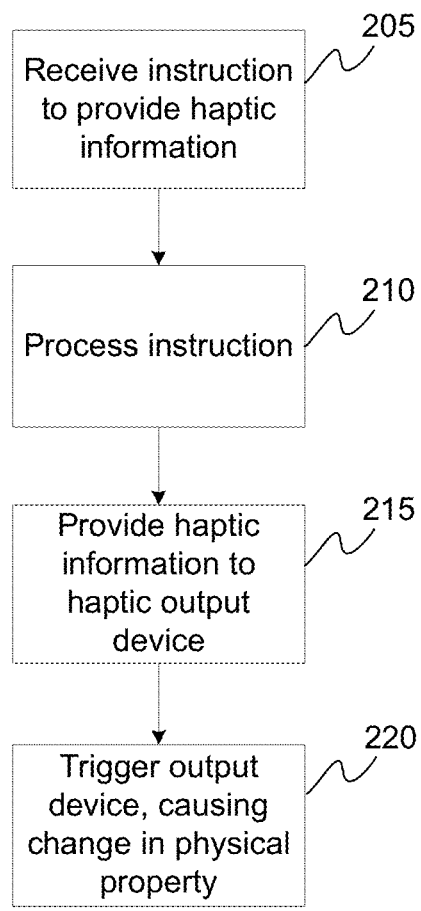
FIG. 2 is a flow diagram of a deformable wearable haptic device in accordance with one embodiment.

FIG. 2 is a flow diagram of a deformable wearable haptic device in accordance with one embodiment. In one embodiment, the functionality of the flow diagram of FIG. 2 (and FIG. 3 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 205, an instruction can be received by the wearable device to provide haptic information. The instruction can come from processor 12 or some other processor in system 10. For example, the instruction can come from a smart phone connected wirelessly to the wearable device. The instruction can be received by processor 12. At 210, the instruction can be processed. The processing will determine what physical property of device 11 will be altered from one physical state to another physical state based on the instruction and the capabilities of device 11. In other words, the processing will determine what type of haptic feedback to provide.

At 215, haptic information can be produced and provided to a haptic output device such as haptic output device 18 via a haptic drive circuit such as drive circuit 16. Haptic output device 18 will vary depending on the capabilities of device 11. Haptic information can be provided to one or more haptic output devices via one or more drive circuits. Multiple haptic output devices can be controlled by a same number of multiple drive circuits or haptic output devices can be grouped so a group of one or more haptic output devices can be controlled by one drive circuit.

At 220, haptic drive circuit 16 triggers haptic output device 18 according to the haptic information, thereby causing a change in a physical property of a tangible element of device 11. In some embodiments haptic output devices will either be triggered on or off, while in other embodiments, the haptic output devices can be triggered to a degree of response.

Figure 3:
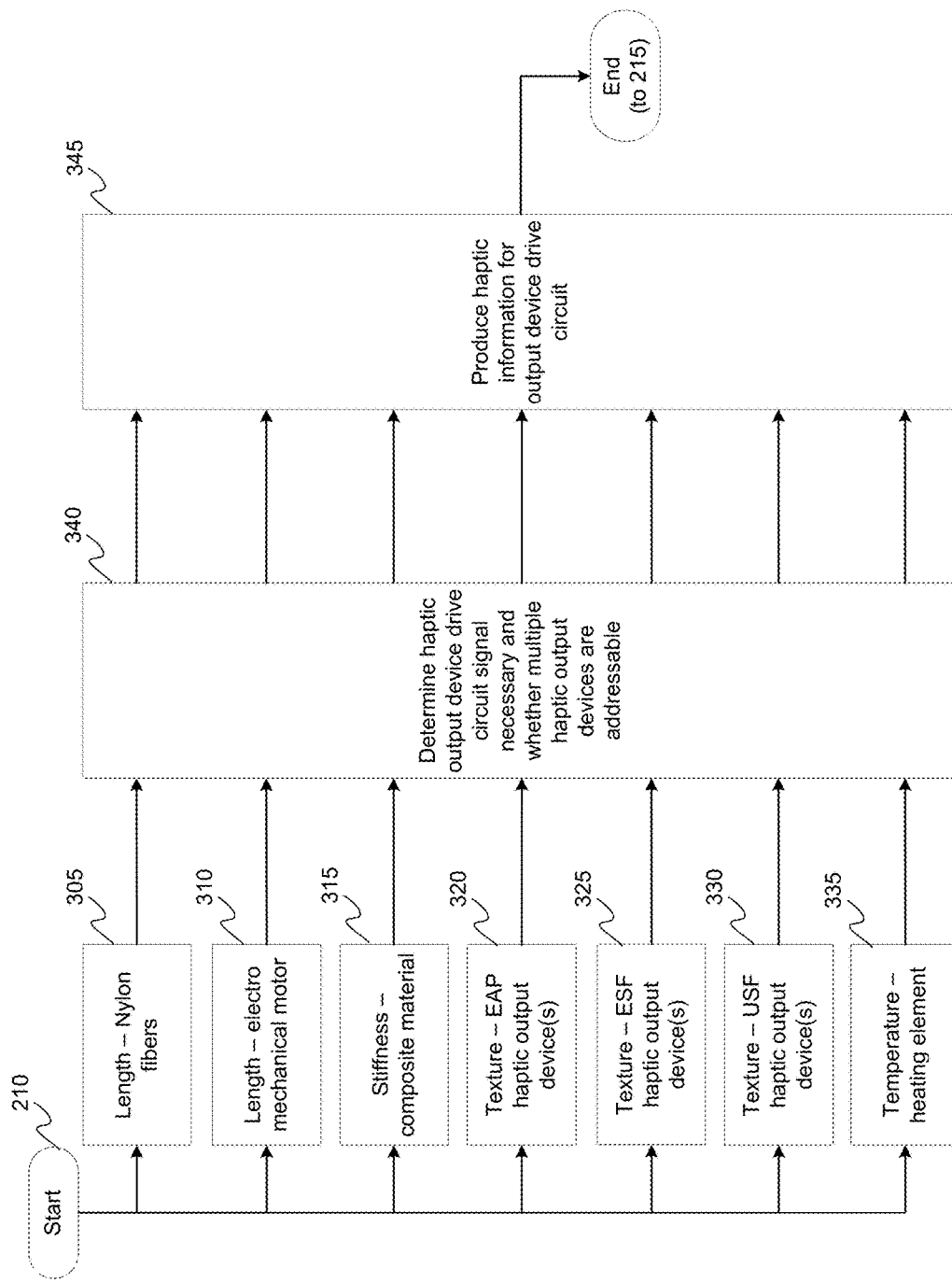
FIG. 3 is a flow diagram illustrating processing an instruction to provide haptic feedback in a deformable wearable device in accordance with some embodiments.

FIG. 3 is a flow diagram illustrating processing an instruction to provide haptic feedback as in element 210 of FIG. 2 in a deformable wearable device, such as device 11, in accordance with some embodiments. One or more of elements 305-335 will be executed depending on the types of haptic output devices available in device 11.

At 305, if nylon fibers are present in device 11 to control the length of a tangible element and the instruction is to shorten or lengthen the tangible element, then haptic information can be determined to cause the nylon fibers to change from one state to another state. For example, to change the length of a wristband, the band can be composed of nylon fibers coated with electrodes. When current is passed through the electrodes the nylon fibers will shrink, effectively reducing the length of the band and creating a squeeze effect. The electrode coating around the nylon fiber can be made of carbon nanotubes that are compliant and can deform with the nylon fibers and still preserve their conductive properties. Another coating can be placed on or around the band of many nylon fibers with carbon nanotubes in the form of a loose jacket, allowing the contraction or expansion of the band and contact area with the user. The contact area with the user can also be formed as two jackets that slide on each other, one jacket sliding into the other, to allow the length of the band to change while avoiding buckling of the jacket, as shown in FIG. 4.

Figure 4:
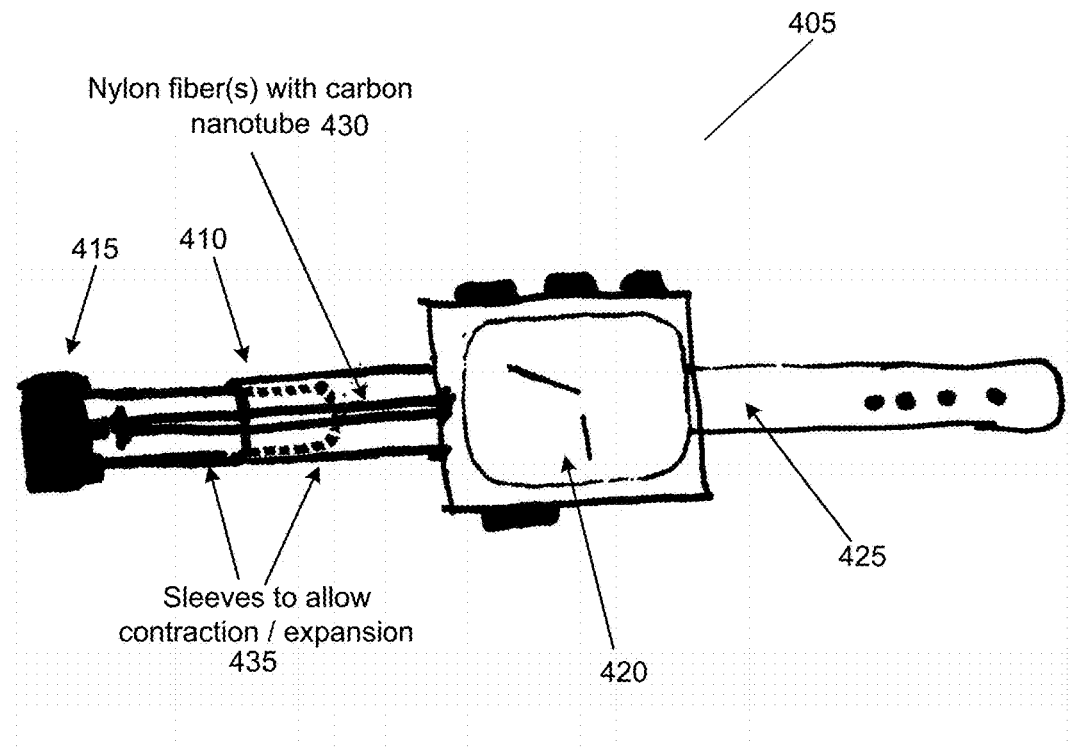
FIG. 4 shows a graphical illustration of a band with two jackets in accordance with one embodiment.

FIG. 4 shows a graphic illustration of a band with two jackets on a portion of the band in accordance with one embodiment. 405 is a watch with a left band portion 410, a clasp 415, watch body 420, and right band portion 425. Watch 405 has a deformable tangible element, which in this example is left band portion 410. A haptic output device is included in the form of nylon fibers coated with carbon nanotubes 430 in left band portion 410 which causes deformation of left band portion 410 when a current is applied to the nylon fibers by the carbon nanotubes. Also included in left band portion 410 are two sleeves 435 that nest to allow contraction or expansion of left band portion 410 without causing buckling of the left band portion material. The sleeves are configured such that the end of one sleeve can slide within the end of the other sleeve, reducing or expanding the length of the tangible member as controlled by haptic output device 430.

One of skill in the art will understand how the example of FIG. 4 can be modified to other wearable devices (e.g., necklaces, backpacks, wristbands, etc.) by using the same technique regardless of sleeve materials, device location, or device function.

Turning back to 305 of FIG. 3, a similar configuration can be used for a backpack strap to adjust the length or tightness of the strap. Other similar configurations can be used for other tangible elements of wearable devices with a length property that can be adjusted, such as necklaces, purse handles, bracelets, and the like.

At 310, if one or more electromechanical motors are present in device 11 to control length of a tangible element and the instruction is to shorten or lengthen the tangible element, then haptic information can be determined to cause the electromechanical motor to turn and shorten or lengthen an attached portion of the tangible element to change from one state to another state. For example, to change the length of a backpack strap, the strap can be attached to the shaft of a motor and the motor turned to tighten the strap by reducing the length of the strap. When current is removed, gravity and the weight of the backpack can cause the strap to return to the previous length. In some embodiments, a locking mechanism on the motor can cause the strap to stay at a particular length. In some embodiments, the motor can be powered in either direction to shorten or lengthen the strap accordingly.

At 315, if composite materials with properties similar to polycaprolactone are present in device 11 to control the stiffness (or rigidity) of a tangible element and the instruction is to alter the rigidity of the tangible element, then haptic information can be determined to cause the polycaprolactone to heat to cause the tangible element to change from one state to another state. For example, device 11 may be a wristband composed of polycaprolactone bars wrapped with nichrome wire to act as a heat generator when current is applied to the wire. When the polycaprolactone reaches a certain temperature (such as 60 degrees Celsius for a 5 mm×152 mm polycaprolactone fiber or a lower temperature for thinner and/or shorter fibers), the stiffness of the band will change. The amount of stiffness can be controlled by controlling the temperature of the polycaprolactone. A thermistor can be included to monitor the temperature of the polycaprolactone. The stiffness can be controlled from a range of soft to hard. Stiffness can be controlled to provide haptic cues for heart rate, distance run, activity or productivity goals, and the like.

At 320, if EAP haptic output devices are present in device 11 to control an aspect of the texture of a tangible element and the instruction is to alter the texture of the tangible element, then haptic information can be determined to cause the EAP haptic output devices to activate and create bumps wherever they are located on the tangible element. For example, device 11 may be a wristband constructed of a plastic band covered with a matrix electrode layer with EAPs deposited thereon. A flexible carbon nanotube layer can be added on top to cover the EAP dots and act as a second electrode to activate the EAP output devices. The surface can have an additional optional layer on top of the carbon nanotube layer for aesthetics or protection. When the EAPs are activated they deform into a dot, detectible by human touch. Even a deformation of as little as 10 micrometers can be detected by human touch. In some embodiments, the matrix electrode layer can be capable of addressing specific EAP dots, either individually or in groups. In such embodiments, a configurable and programmable texture can be created that the user can distinguish amongst other textures. Configurable textures can be selected based on the particular type of haptic instruction or effect that is requested. The EAP material to form the EAP output device dots can be selected from polyvinylidene fluoride ("PVDF") material with piezoelectric properties for maximum displacement. A user can explore the band to receive haptic cues relating to different activities. For example, a heart rate monitor can cause EAP dots to activate in coordination with the user's heart rate for easy tactile monitoring while tending to other activity (e.g., walking, running, watching, listening). Other examples include haptic cues for miles run, messages received, and the like.

Figure 5:
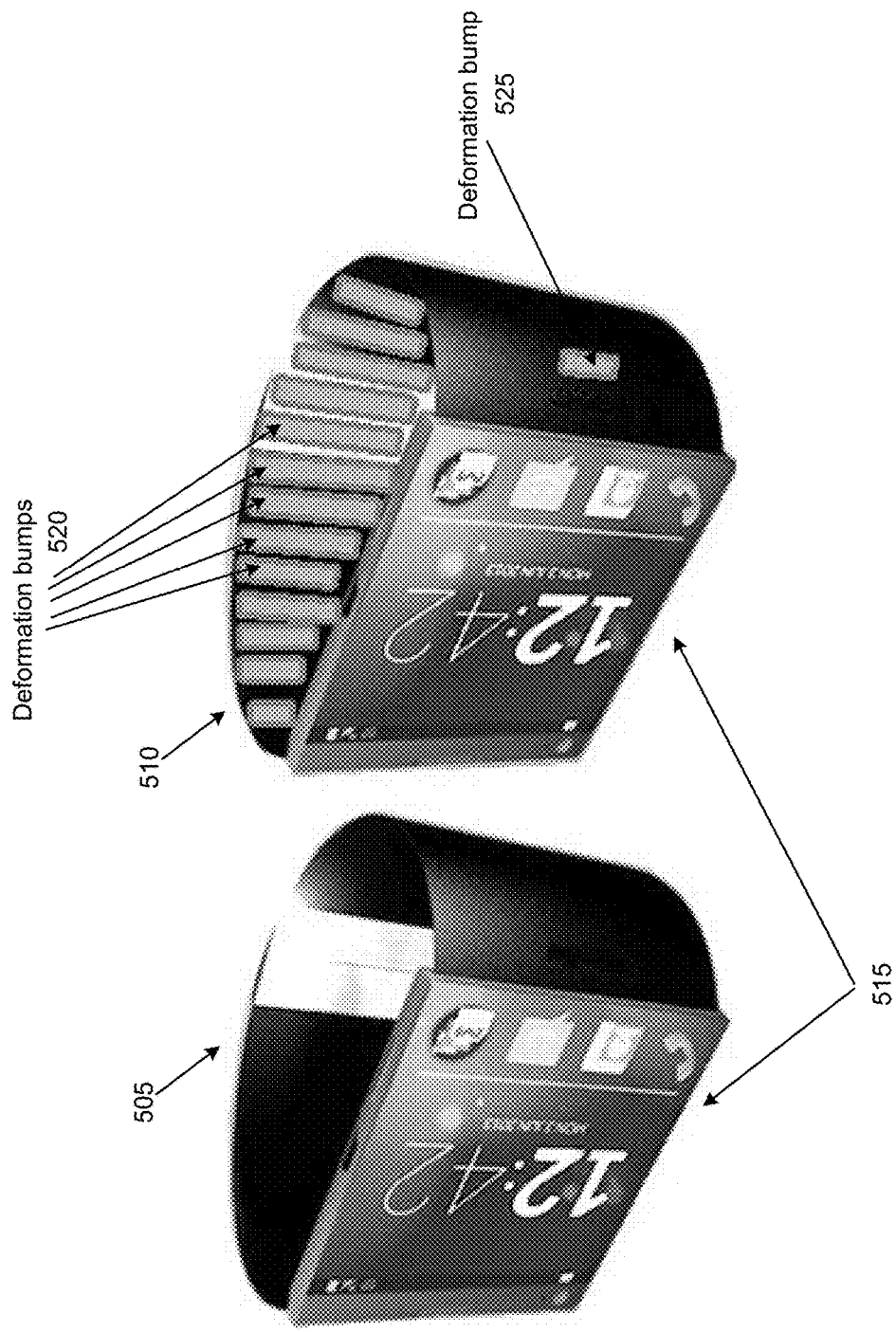
FIG. 5 shows an illustration of a wrist band that is capable of sending deformations to provide feedback on the inside or outside of the device by changing the physical properties of the tangible wrist strap element, in accordance with some embodiments.

FIG. 5 shows an illustration of a wrist band that is capable of sending deformations to provide feedback on the inside or outside of the device by changing the physical properties of the tangible wrist strap element, in accordance with some embodiments. Watch 505 is a smart watch with a screen interface 515. Watch 510 is a smart watch with a screen interface 515 with haptic output devices added to the strap of the watch. Deformation bumps 520 are shown to be added on the inside of the strap. These can be added using EAP output devices and can be bars as shown in FIG. 5 or small bumps. Deformation bump 525 is located on the outside of the strap of watch 510. Other bumps can be added to the inside or outside of the watch band. In some embodiments, bumps can include input sensors, such as sensor 17 of FIG. 1, to become configurable buttons. The embodiments in FIGS. 4 and 5 can be combined to provide multiple types of haptic output capabilities.

Turning back to FIG. 3, at 325, if ESF haptic output devices are present in device 11 to control an aspect of the texture of a tangible element and the instruction is to alter the texture of the tangible element, then haptic information can be determined to cause the ESF output devices to activate and change the friction texture where the haptic output devices are located on the tangible element. For example, device 11 may be a wristband with ESF output devices located thereon. The user could reach and touch the band to receive information about the number of calls, emails, or text messages received by differentiating the number of texture signals in the band at different spatial locations. In another example, a texture can be applied along the length of the band to signal a percentage of distance run so far out of a total target for the run, or a percentage status indicator related to downloading a file, updating a system, or other task. If only half the band has texture, then the user has run 50% or accomplished 50% of the task. ESF output devices can be controlled similar to the EAP output devices as described above.

At 330, if USF haptic output devices are present in device 11 to control an aspect of the texture of a tangible element and the instruction is to alter the texture of the tangible element, then haptic information can be determined to cause the USF output devices to activate and change the friction texture where the haptic output devices are located on the tangible element. For example, device 11 may be a wristband with USF output devices located thereon. Similar to the use of ESF output devices, the user could reach and touch the band to receive information about the number of calls, emails, or text messages received by differentiating the number of texture signals in the band at different spatial locations. Also similar to ESF output devices, in another example, a texture can be applied along the length of the band to signal a percentage of distance run so far out of a total target for the run, or a percentage status indicator related to downloading a file, updating a system, or other task. If only half the band has texture, then the user has run 50% or accomplished 50% of the task. USF output devices can be controlled similar to the EAP output devices as described above. The band could have isolated contiguous regions of piezo output devices with metal or ceramic on top. The different regions can allow the band to wrap around the user's wrist and still allow the rigidity to create a variable friction effect. One or more regions of the band can be activated at different intensities to display different information.

At 335, if a heating element is present in device 11 to control an aspect of the temperature of a tangible element and the instruction is to alter the temperature of the tangible element, then haptic information can be determined to cause the heating element to activate and change the temperature of the tangible element from one state to another. For example, device 11 may be a wristband with a nichrome wire embedded therein. The temperature of the wristband could increase more and more when the user is close to reaching a goal. A thermistor can be incorporated to monitor the temperature of the wristband.

At 340, the haptic output device drive circuit signal that is necessary is determined. If multiple haptic output devices can be addressed individually or in groups, the addressing scheme can be determined and an appropriate information signal created for the haptic drive circuit(s), such as drive circuit 16. Each of the embodiments represented in elements 305-335 can support some level of individual or group addressing. For example, with regard to 305 discrete regions of nylon fibers can be shortened or lengthened together to reduce bunching or evenly distribute stretching over a covering jacket. With regard to 310, multiple motors can be incorporated at different portions of the tangible element(s) to be shortened. With regard to 315, discrete regions of polycaprolacone fibers can be activated to make portions rigid while leaving other portions of the tangible element flexible. With regard to 320, 325, and 330, as discussed above, the electrode matrix can be implemented to support individual or group addressing. With regard to 335, discrete regions of the tangible element can have the temperature manipulated in different ways through separate nichrome (or other heating element) wire.

At 345, appropriate haptic information is produced for the haptic output device drive circuit or circuits, such as drive circuit 16, based on the type of haptic output device and haptic information being targeted.

As disclosed, embodiments incorporate haptic output devices to physically alter a tangible element of a deformable wearable device. The haptic output devices can deform the device from one state to another by altering a physical characteristic of the device, including length, stiffness/rigidity, texture, shape, elasticity, temperature, or friction. Deformation of the device can relate to haptic cues provided to a user of the wearable device.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A wearable haptically-enabled device, comprising:
an interface for receiving an instruction to provide haptic information corresponding to a haptic event occurring in a simulated or virtual environment;
a tangible element having a length, the tangible element including a strap having a first sleeve and a second sleeve;
a haptic output device including fibers arranged longitudinally with the tangible element, the haptic output device being configured to render a haptic effect corresponding to the haptic event; and
a haptic output drive circuit configured to control the haptic output device to cause the haptic effect to be rendered by changing the fibers and altering the tangible element from a first length to a second length by sliding the first sleeve relative to the second sleeve.

2. The device of claim 1, wherein
the fibers comprise nylon fibers, and
the haptic output device is configured to cause the nylon fibers to shrink and the length of the tangible element to shorten from the first length to the second length.

3. The device of claim 1, wherein
the haptic output device includes a motor, and
the haptic output device is configured to cause the motor to turn and the length of the tangible element to shorten from the first length to the second length.

4. The device of claim 1, wherein
the tangible element includes a stiffness,
the haptic output device includes polycaprolactone bars wrapped with a heating element, and
the haptic output device is configured to cause the stiffness of the tangible element to change from a first stiffness to a second stiffness.

5. The device of claim 1, wherein
the haptic output device includes at least one of an electrostatic friction haptic output device, an ultrasonic frequency haptic output device, or an electroactive polymer, and
the haptic output device is configured to cause a texture of the tangible element to change from a first texture to a second texture.

6. The device of claim 1, further comprising:
nylon fibers coated with carbon nanotubes comprising the strap,
wherein the first sleeve is arranged to slide into the second sleeve,
the haptic output device is configured to cause the nylon fibers to shrink and the tangible element to shorten from the first length to the second length, the first length including that the first sleeve is slid slightly into the second sleeve, and the second length including that the first sleeve is slid more into the second sleeve than in the first length.

7. The device of claim 1, wherein
the strap comprises a base material, a conductor matrix, a conductor layer, and
the haptic output device comprises at least one of an electrostatic friction haptic output device, an ultrasonic frequency haptic output device, or an electroactive polymer, and
the haptic output device is configured to cause a texture of the strap to change from a first texture to a second texture.

8. The device of claim 1, wherein the tangible element includes a physical property of at least one of length, stiffness, texture, shape, elasticity, temperature, or friction.

9. The device of claim 8, wherein the tangible element includes at least two physical properties and altering from a first state to a second state includes altering at least two physical properties.

10. The haptically-enabled device according to claim 1, further comprising:
at least a first sensor configured to sense interactions with the haptically-enabled device or to capture environmental conditions.

11. The haptically-enabled device according to claim 10, wherein the haptic information is regarding at least a first environmental condition proximate to the haptically-enabled device via a haptic response.

12. A haptically-enabled system, comprising:
a wearable haptically-enabled device including
a tangible element having a length, the tangible element including a strap having a first sleeve and a second sleeve;

a haptic output device including a motor attached to the tangible element, the haptic output device being configured to render a haptic effect corresponding to a haptic event occurring in a simulated or virtual environment; and a haptic output drive circuit configured to control the haptic output device to cause the haptic effect to be rendered by altering the tangible element from a first length to a second length by causing the motor to turn and slide the first sleeve relative to the second sleeve.

13. The system of claim 12, wherein turning the motor is configured to cause the length of the tangible element to shorten from the first length to the second length.

14. The system of claim 12, wherein
the tangible element includes a stiffness,
the haptic output device includes polycaprolactone bars wrapped with a heating element, and
the haptic output drive circuit causes the heating element to heat causing the stiffness of the tangible element to change from a first stiffness to a second stiffness.

15. The system of claim 12, wherein
the tangible element includes a texture,
the haptic output device includes at least one of an electrostatic friction haptic output device, an ultrasonic frequency haptic output device, or an electroactive polymer, and
the haptic output drive circuit enables the haptic output device causing the texture of the tangible element to change from a first texture to a second texture.

16. The system of claim 12, wherein
the wearable haptically-enabled device further comprises nylon fibers coated with carbon nanotubes comprising the strap,
the first sleeve is arranged to slide into the second sleeve,
the haptic output device comprises the nylon fibers coated with carbon nanotubes, and
the haptic output drive circuit causes the nylon fibers to shrink causing the tangible element to shorten from the first length to the second length, the first length including that the first sleeve is slid slightly into the second sleeve, and the second length including that the first sleeve is slid more into the second sleeve than in the first length.

17. The system of claim 12, wherein
the strap comprises a base material, a conductor matrix, a conductor layer, and
the haptic output device comprises at least one of an electrostatic friction haptic output device, an ultrasonic frequency haptic output device, or an electroactive polymer, and
the haptic output drive circuit enables the haptic output device causing a texture of the strap to change from a first texture to a second texture.

18. The system of claim 12, wherein the tangible element includes a physical property of at least one of length, stiffness, texture, shape, elasticity, temperature, or friction.

19. The system of claim 18, wherein the tangible element includes at least two physical properties and altering the tangible element from a first state to a second state includes altering the at least two physical properties.

20. A wearable haptically-enabled device, comprising:
an interface for receiving an instruction to provide haptic information;
a tangible element having a stiffness; and
a haptic output device attached to the tangible element,
wherein the haptic output device heats the tangible element to cause an alteration from a first stiffness to a second stiffness, and
the haptic output device includes polycaprolactone bars wrapped with a heating element.

* * * * *